May 21, 1946.  S. B. HASELTINE  2,400,504
FRICTION SHOCK ABSORBER
Filed Jan. 27, 1944
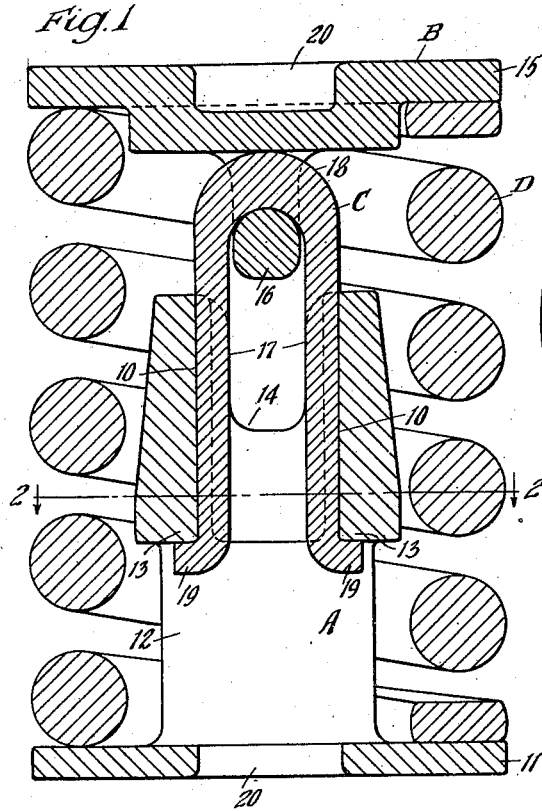
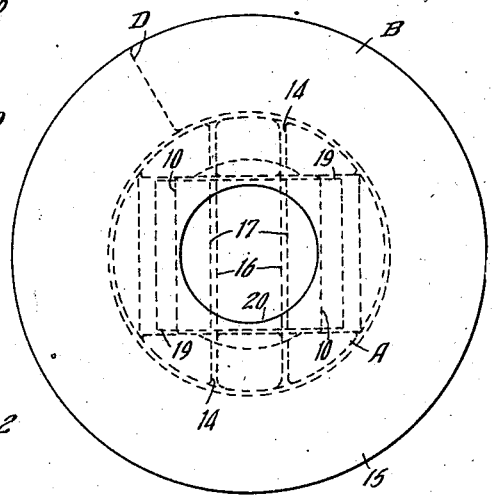
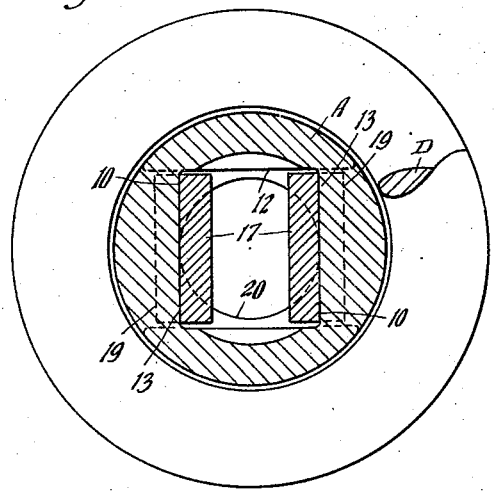
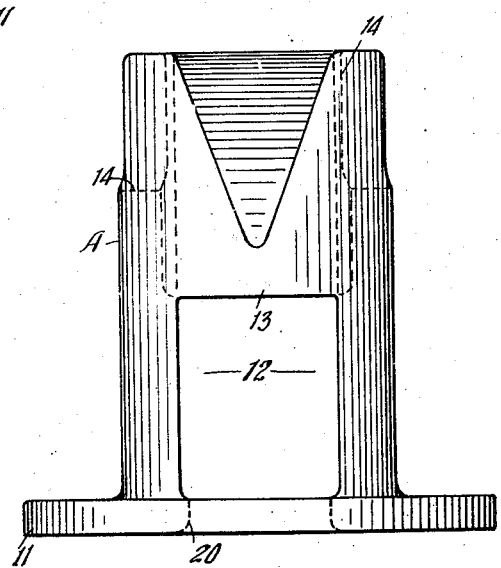
Inventor
Stacy B. Haseltine
By Henry Fuchs. Atty.

Patented May 21, 1946

2,400,504

UNITED STATES PATENT OFFICE 2,400,504

FRICTION SHOCK ABSORBER

Stacy B. Haseltine, La Grange, Ill., assignor to W. H. Miner, Inc., Chicago, Ill., a corporation of Delaware Application January 27, 1944, Serial No. 519,892

3 Claims. (Cl. 267—9)

This invention relates to improvements in friction shock absorbers, especially adapted for snubbing or dampening the action of railway car truck springs.

One object of the invention is to provide a friction shock absorber for snubbing the action of truck springs of railway cars comprising a friction casing, a cooperating, inherently resilient, expandible friction member having sliding frictional engagement within the casing, and a spring resistance element opposing relative sliding movement of the casing and friction member, wherein the frictional resistance produced is substantially constant during all phases of operation of the device.

A more specific object of the invention is to provide a friction shock absorber, as set forth in the preceding paragraph, wherein the friction casing is provided with opposed, longitudinally extending, interior friction surfaces, and the expandible friction member is in the form of a U-shaped spring plate having the arms thereof in sliding frictional engagement with the friction surfaces of the casing.

Other objects of the invention will more clearly appear from the description and claims hereinafter following.

In the drawing forming a part of this specification, Figure 1 is a transverse vertical sectional view of the improved friction shock absorber. Figure 2 is a horizontal sectional view, corresponding substantially to the line 2—2 of Figure 1. Figure 3 is a top plan view of Figure 1. Figure 4 is an elevational view of the friction casing of the improved shock absorber looking from left to right in Figure 1.

My improved shock absorber comprises broadly a friction casing A; an upper follower B; a U-shaped friction member C carried by the follower B and slidable within the casing; and a spring D opposing relative movement of the casing and friction member.

The casing A is in the form of a cylinder having two opposed, interior, flat friction surfaces 10—10 extending lengthwise thereof. The friction surfaces 10—10 are at the upper end of the casing, as shown in Figure 1, and are preferably parallel to each other. At the base thereof, the casing A is provided with a laterally projecting, annular flange 11, which forms the lower follower member of the device.

The side wall of the casing A is provided with relatively large, substantially rectangular openings 12—12 at diametrically opposite sides of the same, inwardly of the friction surfaces 10—10. The transverse upper end walls of the openings 12—12 provide horizontal stop shoulders 13—13 for a purpose hereinafter pointed out. At the upper end, the casing is provided with inwardly extending guide slots 14—14 at diametrically opposite sides thereof, said slots being open at their upper ends. As shown in Figure 1, the longitudinal axes of the slots 14—14 lie in a central vertical plane, which is parallel to the planes of the friction surfaces 10—10.

The upper follower B is in the form of a disc having a laterally projecting, annular flange 15 of lesser thickness than the central main body of said disc.

Depending from the central portion of the disclike follower B is a transversely disposed eye member 16, which is vertically aligned with the slots 14—14 of the casing A, and is adapted to travel in said slots as the follower B is moved axially toward the casing.

The friction member C is in the form of a U-shaped resilient steel plate of rectangular cross section comprising spaced, parallel, side arms 17—17 in the form of substantially flat plate sections and a curved section 18 connecting said arms at their upper ends. The section 18 is slightly thicker than the arms 17—17 and is engaged through the opening of the eye member 16. The section 18 is supported on the cross member of the eye 16, and the upper side of the curved section 18 abuts the underneath surface of the follower B, whereby said friction member C is fixed to the follower B for movement in unison therewith.

The arms 17—17 of the member C extend into the casing A and have sliding frictional engagement with the friction surfaces 10—10 of the latter.

The lower ends of the arms are turned laterally outwardly, thereby providing stop lugs 19—19, which engage underneath the shoulders 13—13 of the casing to limit outward movement of the friction member C and the associated follower B and hold the mechanism assembled.

The spring D comprises a single heavy coil surrounding the casing A and having its top and bottom ends bearing respectively on the flange 15 of the follower B and the flange 11 of the casing A. The spring D is preferably under initial compression.

The U-shaped spring plate friction member C, through its spring action, has a tendency to expand, thus holding the arms thereof in tight frictional contact with the friction surfaces of the casing and maintaining the stop lugs 19—19 in cooperative relation with the shoulders 13—13.

Inasmuch as the U-shaped friction member C is in the form of a resilient spring plate, the arms thereof may be flexed toward each other so that the lugs 19—19 will clear the friction surfaces of the casing to permit telescoping of the arms within the casing in assembling the parts of the mechanism.

My improved shock absorber preferably replaces one of the spring units of a truck spring cluster, being interposed between the top and bottom spring follower plates of said cluster. However, as will be evident to those skilled in this art, several of these improved shock absorbers may be used in a single spring cluster, replacing two or more units of the same. In order to accommodate the usual centering projections employed on a well-known form of spring follower plate, the follower B and the base portion of the casing A are provided with openings 20—20.

The operation of the improved shock absorber is as follows: Upon the spring cluster of the truck of a railway car being compressed between the spring follower plates of said cluster, the follower B and the casing A will be moved toward each other against the resistance of the spring D, the U-shaped member C being moved in unison with the follower B. During this action, the arms 17—17 of the resilient U-shaped friction member are forced to slide inwardly of the friction casing A along the friction surfaces 10—10 thereof, thereby snubbing the action of the truck springs. Upon recoil of the truck springs, the spring D is free to expand and return all of the parts to normal position, outward movement of the U-shaped member and follower B being limited by the stop lugs 19—19 of the member B coming into engagement with the shoulders 13—13 of the casing.

As will be evident, the frictional resistance provided by my improved shock absorber remains substantially constant during both compression and expansion of the mechanism, thus providing the desired snubbing action in both compression and recoil of the truck springs.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a cylindrical friction casing having interior, longitudinally extending, opposed, flat friction surfaces at one end thereof and an integral follower member at the other end thereof; of a follower movable axially toward the end of the casing having the friction surfaces; a U-shaped friction spring member movable in unison with said follower, said member having a pair of resilient, flat, straight, platelike arms telescoped within the casing in sliding engagement with the friction surfaces thereof; and a coil spring surrounding said casing and bearing at its opposite ends on said follower member and follower.

2. In a friction shock absorber, the combination with a lower friction casing having opposed, interior friction surfaces at the upper end thereof; of a base flange on said casing; an upper follower, said upper follower and casing being movable toward and away from each other in vertical direction; a depending eye on said upper follower integral therewith; diametrically opposite guide slots in said casing cooperating with said eye to slidingly guide the same; a U-shaped spring plate member engaged through said eye and having depending platelike friction arms slidably engaged with the interior friction surfaces of the casing; and a coil spring surrounding said casing and having its top and bottom ends bearing respectively on said upper follower and base flange of the casing.

3. In a friction shock absorber, the combination with a friction casing having longitudinally extending, interior friction surfaces; of a resilient U-shaped friction member having the arms thereof in sliding frictional engagement with the friction surfaces of the casing, said casing and member being movable toward and away from each other in lengthwise direction, said arms having outturned hooked ends; shoulders on said casing engageable by said hooked ends to limit longitudinal separation of said casing and member; and spring means yieldingly opposing relative movement of said casing and member toward each other.

STACY B. HASELTINE.